Jan. 1, 1929.  1,697,157

C. B. BACKER

WATER HEATER

Filed March 18, 1927

WITNESSES:
R. S. Williams
J. M. Biebel

INVENTOR
Christian B. Backer
BY
Wesley J. Barr
ATTORNEY

Patented Jan. 1, 1929.

1,697,157

UNITED STATES PATENT OFFICE.

CHRISTIAN BERGH BACKER, OF TIMPERLEY, ENGLAND.

WATER HEATER.

Application filed March 18, 1927. Serial No. 176,417.

My invention relates to electrically heated devices and partictularly to electrically heated fluid containers.

An object of my invention is to provide a relatively simple, compact and easily assembled fluid heater that shall embody a highly efficient tubular heating unit.

In practicing my invention, I provide a casing or container embodying a substantially semi-cylindrical groove in its outer surface, a tubular heating unit comprising an outer metal casing and a resistor compacted therein by expansively oxidized electric-insulating and heat-conducting crystalline material, and a resilient member for holding the heating unit in the groove.

Figure 1:
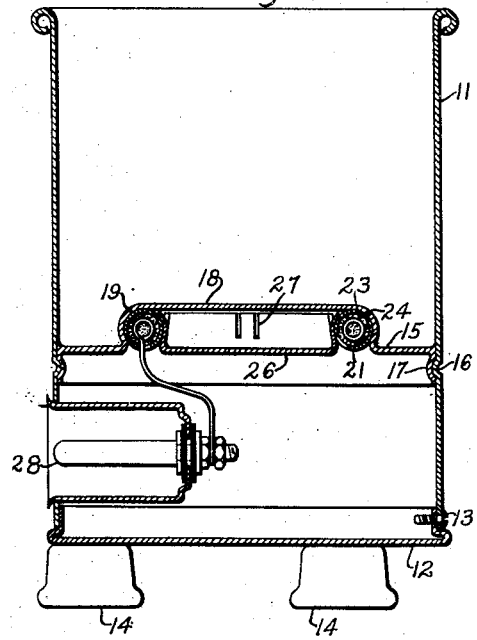
Figure 3:
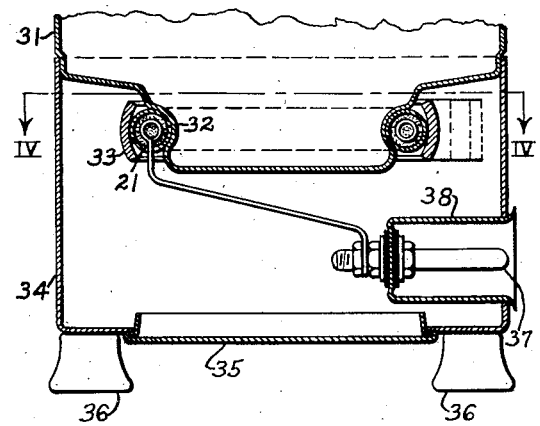
Figure 2:
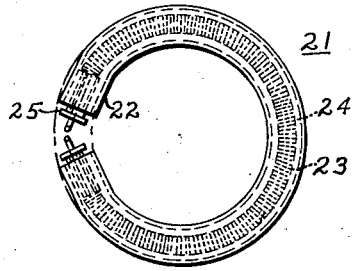
Figure 4:
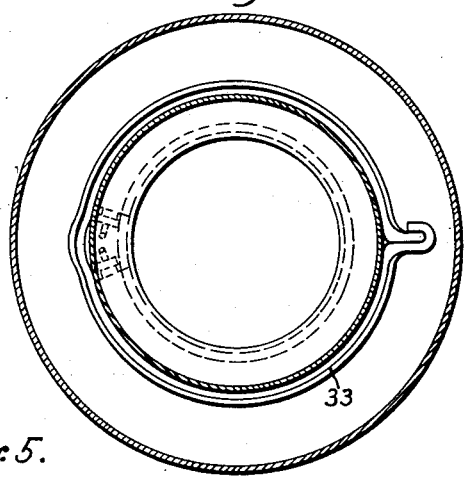
Figure 5:
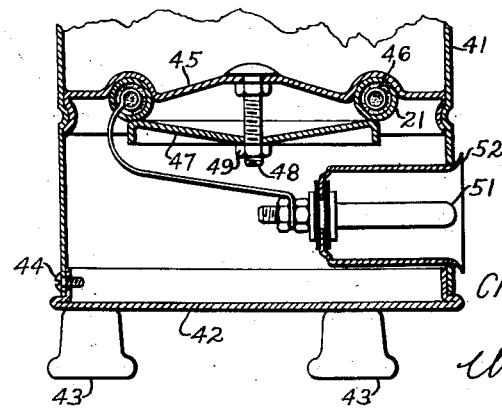

In the single sheet of drawings,

Fig. 1 is a view, in vertical section, of a fluid heater embodying my invention, Fig. 2 is a top plan view of a resilient heating unit employed with the container of Fig. 1, Fig. 3 is a partial view, in vertical section, of a modified form of fluid heater embodying my invention, Fig. 4 is a view, in horizontal section taken on the line IV—IV of Fig. 3, and Fig. 5 is a view, in vertical section, of a portion of a still further modification of a device embodying my invention.

Referring more particularly to Fig. 1 of the drawing, a fluid casing or container 11 is provided with a bottom closure member 12 which may be secured thereto by any means, here indicated as a plurality of screws 13. A plurality of supports 14 are provided and are suitably secured to the closure 12.

A bottom portion 15 is provided for the casing or container 11 and is secured thereto, at its periphery, by any suitable means, here shown as an inwardly extending peripheral groove 16 in the wall of the casing 11 and a cooperating annular groove in a flange portion 17 of the bottom member 15. The intermediate portion 18 of the bottom member 15 is so shaped that it is located above the outer peripheral portion of the bottom member 15. The peripheral portion of the part 18 is so shaped as to provide an annular groove 19 that is of substantially semi-circular shape in lateral section, as is shown in the drawing.

A heating unit 21 is located within the groove 19 and comprises a tubular outer metal casing 22 and a resistor member 23 located, and tightly compacted, therein by a mass 24 of expansively oxidized electric insulating and heat-conducting crystalline material which is produced in accordance with the disclosure of my reissued Patent No. 16,340. Briefly, the method of making the said heating unit comprises winding a resistor wire in the form of an open helix, locating the helix within an outer envelope of metallic magnesium, which outer envelope may be an open helix of a flat strip of metallic magnesium, then locating the resistor and the covering of metallic magnesium within a casing 21 and subjecting the assembled elements to the action of high-pressure and high-temperature steam for a predetermined length of time. The initially metallic magnesium is changed into a substantially solid and crystalline structure of magnesium hydroxide or magnesium oxide which has a tendency to expand to substantially 200% of its initial volume. The aforesaid expansion during the treating operation tightly compacts the resistor member within the metal casing and thus provides an excellent heating path therefrom to the casing.

Suitable bushing members 25 are provided at each end of the substantially annular shaped casing 21, through which the ends of the resistor 23 may extend.

The heating unit hereinbefore described is of such dimensions, as regards the outer diameter of the annulus, that it fits tightly within the groove 19 which is of such radial dimension that it is necessary to force the heating unit 21 into the groove. The heating unit is held within the groove by a resilient member 26, of substantially cup-shape, the flange portion whereof is provided with lips 27 bent outwardly in order to insure a close engagement with the casing 22 to provide a close engagement between the portions of the flange of the resilient retaining member 26 and the casing.

The end portions of the resistor 23 are connected to the inner end portions of terminal pins 28 which are insulatedly mounted in a terminal guard member 29 of the usual shape, the member 29 being mounted within an opening in the bottom portion of the casing 11 in a manner well-known in the art.

Referring more particularly to Fig. 3 of the drawing, a container 31 is shown as being provided with a depending bottom portion having a substantially semi-circular groove 32 formed in a bottom portion thereof within which the hereinbefore described heating unit may be located. A resilient clamping member 33 is mounted upon the outside of the casing 21, and any suitable means for holding it may be employed, this means being shown more particularly in Fig. 4 of the drawing as embodying radially extending integral end portions thereof, one of which is bent around the other. While I have shown a particular embodiment of a resilient clamping member, I do not wish to be restricted thereto, as this is shown for illustrative purposes only and other means for effecting the same result may be employed.

A bottom portion 34 is provided for the container 31, which may be partially open at the bottom and be closed by a closure member 35. Legs 36 may be secured to the bottom end of the bottom portion 34.

Contact pins 37 are insulatedly mounted in a guard 38, the ends of the resistor member 23 being connected thereto in a manner well-known in the art.

Referring more particularly to Fig. 5 of the drawing, a container 41, which may be of substantially the same general shape as that shown in Fig. 1, is provided with a bottom closure member 42 to which are secured legs 43. A plurality of screws 44 are used to hold the bottom closure member in proper operative position relatively to the bottom portion of the container 41.

A bottom 45 is provided for the container 41, interfitting annular grooves being provided, as hereinbefore described, for the container 11 and the bottom 15 illustrated in Fig. 1. The bottom member 45 is provided with an annular substantially semi-cylindrical groove 46 in the bottom surface thereof, and a heating unit of the type hereinbefore described is located in this groove. As the groove 46 in the member 45 is substantially in the bottom of the member 45, instead of at the inside or the outside thereof, as was the case in Figs. 1 and 3, respectively, I provide a resilient clamping means which engages the bottom portion of the casing 22 and embodies a flat plate 47 which is provided with a small depending flange portion and a plurality of radially extending slits in order to make the member more resilient. A clamping bolt 48 extends through the bottom portion 45 and the plate 47 and a cooperating nut 49 permits of tightly clamping the heating unit in the groove 46.

Terminal pins 51 and a terminal-pin guard 52 are provided, the ends of the resistor wire 23 being electrically connected to the respective terminal pins in a manner well-known in the art.

It may be noted that the device embodying my invention in all of its modifications, embodies a container having a thin wall having a groove therein, a lateral section of which is substantially semi-circular, within which a resilient tubular heating unit is located and held in proper operative position by a resilient member which operatively engages that portion of the peripheral surface of the metal casing located substantially opposite to that portion thereof which engages the wall of the groove.

Any replacement of a damaged heating unit is easily and quickly effected in all of the different modifications disclosed in this application, by the removal of the resilient clamping member, the disconnection of the ends of the resistor member from the terminal pins removal of the damaged unit, the insertion of a new heating unit and the reconnection of the resistor ends to the terminal pins.

Various modifications may be made in the device embodying my invention without departing from the spirit and scope thereof, and I desire that only such limitations shall be placed thereon as are imposed by the prior art or are set forth in the appended claims.

I claim as my invention:

1. The combination with a container having a bottom portion shaped to form an annular groove external to the casing, a resilient tubular heating unit having a predetermined portion only of its peripheral surface operatively engaging the wall of said groove, and resilient means operatively engaging another portion of the peripheral surface of the tubular heating unit for holding said unit in close operative engagement with the wall of the groove.

2. In an electrically heated device, the combination with a container embodying a groove, a tubular heating unit in said groove comprising an outer metal casing, a resistor in said casing, and expansively oxidized electric-insulating material compacting said resistor in said metal casing, and a resilient member for holding said heating element in said groove.

3. In an electrically heated device, the combination with a container embodying a substantially semi-cylindrical groove, a resilient tubular heating unit operatively engaging said groove, said unit comprising an outer metal casing, a resistor member in said casing and expansively oxidized electric-insulating and heat-conducting crystalline material compacting said resistor in the casing, and a resilient member for holding the heating unit in said groove.

In testimony whereof, I have hereunto subscribed my name this 2nd day of March, 1927.

CHRISTIAN BERGH BACKER.